Patented Oct. 17, 1939

2,176,833

UNITED STATES PATENT OFFICE 2,176,833

MERCERIZATION ASSISTANT

Herman A. Bruson and Clinton W. MacMullen, Philadelphia, Pa., assignors to Röhm & Haas Company, Philadelphia, Pa.

No Drawing. Application March 30, 1937, Serial No. 133,826

7 Claims. (Cl. 8—127)

This invention relates to mercerizing assistants and to a process which comprises adding to mercerizing baths, containing caustic alkali, certain new organic compounds hereunder specified, which assist the penetration of the alkali into the cellulose and give faster, more uniform, and more thorough mercerization.

It is already known that certain phenols and fatty acids act as mercerizing assistants. Furthermore, it is common practice to add certain cyclic alcohols, such as cyclohexanol and α-terpineol, to mercerizing baths to assist penetration. Phenols, however, darken the mercerizing liquors, especially when the latter are concentrated for re-use, while the alcohols are lost by evaporation. Many of the organic acid mercerizing assistants used, separate out from the concentrated alkali solution and cause difficulties in processing, or else are decomposed.

We have found, however, that compounds, having the general formula R—O—X—OH wherein R is a sulfonated aromatic nucleus of the benzene or naphthalene series, and X is one of the group consisting of alkylene and polyalkylene ether radicals having at least two carbon atoms directly attached to each other in each alkylene group, possess not only a high degree of solubility and stability in strong caustic alkali solutions but will quickly wet out cotton or cellulose in a mercerizing bath. Good results are obtained with compounds of the formula

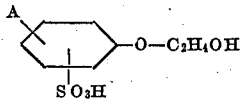

wherein A is an alkyl group up to about twelve carbon atoms in size, or an aralkyl group such as benzyl, or a cycloalkyl group such as cyclohexyl, or a phenyl group. Furthermore, compounds of the general formula

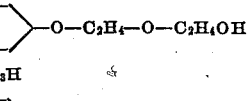

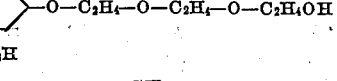

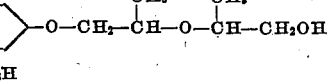

which preferably contain an alkyl substituent attached to the aromatic nucleus, are useful for this purpose. More than one sulfonic acid group may be present in the aromatic nucleus. The compounds set forth above are preferably added in the form of their neutral alkali metal salts dissolved in water to the mercerizing bath in an amount corresponding to from about 0.5% to 1% on the weight of the caustic solution. Some of these compounds are disclosed in copending U. S. application Serial No. 755,358, filed November 30, 1934 now Patent No. 2,075,018, March 30, 1937.

The above mercerization assistants are manufactured by treating an aromatic ether alcohol of the general formula R—O—X—OH wherein R is an aromatic nucleus of the benzene and naphthalene series, and X is an alkylene or polyalkylene ether group having at least two carbon atoms directly attached to each other in each alkylene group, with an excess of a sulfonating agent, such as concentrated or fuming sulfuric acid, chlorosulfonic acid, or sulfur trioxide, so as to sulfonate or poly-sulfonate the aromatic nucleus R and to convert the terminal alcoholic hydroxyl group into a sulfuric acid ester. This sulfonated aromatic ether sulfate is then subjected to mild acid hydrolysis, which splits off the terminal sulfuric ester group and regenerates the free alcoholic hydroxyl group without affecting the sulfonic group which is attached to the aromatic nucleus R.

In order to illustrate this invention, the following examples are given:

Example 1 p-α,α,γ,γ-tetramethylbutylphenoxy ethanol was prepared by the condensation of diisobutylene with phenol, and reaction of the resulting alkyl phenol with ethylene chlorhydrin in the presence of caustic soda. B. P. 142°–157°/2 mm.

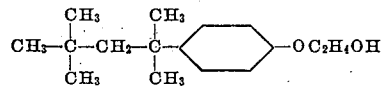

150 g. of 98% sulfuric acid was added with stirring in the course of one hour to 125 g. of p-α,α,γ,γ-tetramethylbutylphenoxy ethanol, allowing the temperature to rise to 60° C. The dark red mixture was then stirred two hours.

500 cc. of water was added, and the mixture warmed two hours on the steam bath with stirring to hydrolyze the sulfuric acid ester group to an hydroxyl group.

The dark brown solution was cooled to room temperature and neutralized by the addition of solid sodium hydroxide. The neutral brown solution was cooled at 0° to 10° C. overnight and the gelatinous mass filtered by suction, leaving a white crystalline residue of sodium sulfate. The filtrate was chilled again and some additional sodium sulfate removed. p-α,α,γ,γ-tetramethylbutylphenoxy ethanol sodium sulfonate was obtained in aqueous solution in the filtrate.

*Example 2*

128 g. of chlorosulfonic acid was added to 125 g. of p - α,α,γ,γ - tetramethylbutylphenoxy ethanol dropwise, with stirring, in the course of one hour. During the addition the mixture was cooled below 20° C.

Hydrogen chloride was given off. The mixture was stirred one hour at 20° to 30° C. and allowed to stand overnight.

500 cc. of water was added and the mixture heated two hours on the steam bath to hydrolyze the sulfuric acid ester group.

The clear, dark brown solution was cooled, and neutralized by the addition of solid sodium hydroxide.

A portion of the neutral solution was dried in vacuo at 50°–73°/50–10 mm. for six hours. A pink, dry powder was obtained, which was readily soluble in water.

The remainder of the neutral solution was cooled at 0° to 10° C. overnight, and the gelatinous mass filtered, leaving a white crystalline residue. The clear, amber red filtrate contained p-α,α,γ,γ-tetramethylbutylphenoxy ethanol sodium sulfonate in aqueous solution.

*Example 3*

α,α,γ,γ-tetramethylbutyl-β-naphthoxy ethanol was prepared by the condensation of diisobutylene with β-naphthol, and reaction of the resulting alkyl naphthol with ethylene chlorhydrin in the presence of sodium hydroxide.

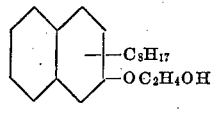

B. P. 212°–222°/5 mm.

150 g. of 98% sulfuric acid was added dropwise with stirring to 150 g. of melted α,α,γ,γ-tetramethylbutylnaphthoxy ethanol allowing the temperature to rise to 60° C. The viscous, dark mixture was stirred two hours.

500 cc. of water was added and the mixture heated two hours on the steam bath. The solution was cooled and neutralized with solid sodium hydroxide. The neutral red solution was cooled at 0° to 10° C. overnight and filtered from the crystalline residue. The filtrate contained α,α,γ,γ-tetramethylbutylnaphthoxy ethanol sodium sulfonate in aqueous solution.

*Example 4* p-cyclohexyl phenoxy ethanol was prepared by the condensation of p-cyclohexyl phenol with ethylene chlorhydrin in the presence of sodium hydroxide.

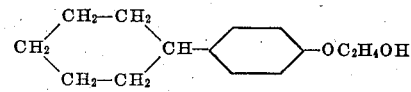

B. P. 146°–154°/1 mm.

150 g. of 98% sulfuric acid was added dropwise, with stirring to 110 g. of melted p-cyclohexyl phenoxy ethanol, allowing the temperature to rise to 60° C. The mixture was stirred two hours, 500 cc. of water added, and the mixture heated two hours on the steam bath.

The solution was cooled and neutralized with solid sodium hydroxide. The neutral solution was cooled at 0° to 10° C. overnight and filtered from the white residue. p-cyclohexyl phenoxy ethanol sodium sulfonate was obtained in aqueous solution in the filtrate.

*Example 5* p-α,α,γ,γ-tetramethylbutylphenoxyethoxy ethanol was prepared by alkaline condensation of p-α,α,γ,γ-tetramethylbutyl phenol with β,β'-dichlorodiethyl ether, conversion of the p-α,α,γ,γ-tetramethylbutylphenoxyethoxy ethyl chloride (B. P. 175°–205°/3 mm.) to the acetate with potassium acetate, and saponification of the acetate (B. P. 181°–210°/2 mm.) to the alcohol, B. P. 170°–192°/2 mm.

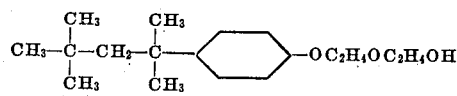

150 g. of 98% sulfuric acid was added dropwise, with stirring, to 147 g. of p-α,α,γ,γ-tetramethylbutylphenoxyethoxy ethanol, allowing the temperature to rise to 60° C. The red brown mixture was stirred two hours, 500 cc. of water added, and the mixture heated two hours on the steam bath.

The solution was cooled to room temperature, neutralized with solid sodium hydroxide, cooled overnight at 0° to 10° C., and filtered. p-α,α,γ,γ-tetramethylbutylphenoxyethoxy ethanol sodium sulfonate was obtained in aqueous solution in the filtrate.

*Example 6* p - α,α,γ,γ - tetramethylbutylphenoxyethoxy - ethoxy ethanol was prepared by the alkaline condensation of p-α,α,γ,γ-tetramethylbutyl phenol with β-chloroethoxy-β'-chlorodiethyl ether, conversion of the resulting p-α,α,γ,γ-tetramethylbutylphenoxyethoxyethoxy ethyl chloride (B. P. 200°–220°/3 mm.) to the acetate (B. P. 190°–215°/2 mm.) and saponification of the acetate to the alcohol, B. P. 195°–217°/2 mm.

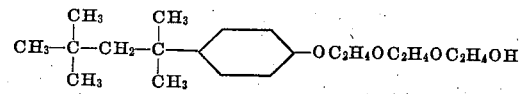

150 g. of 98% sulfuric acid was added dropwise, with stirring, to 169 g. of p-α,α,γ,γ-tetramethylbutylphenoxyethoxyethoxy ethanol, allowing the temperature to rise to 60° C. The dark brown, viscous mass was stirred two hours, 500 cc. of water added, and the mixture heated on the steam bath two hours.

The solution was cooled, neutralized with solid sodium hydroxide, cooled at 0° to 10° C. overnight, and filtered. p-α,α,γ,γ-tetramethylbutylphenoxyethoxyethoxy ethanol sodium sulfonate was obtained as an aqueous solution in the filtrate.

In a similar manner, phenoxy ethanol, α- or β-naphthoxyethanol, o-, m-, or p-cresyloxyethanol, p-ter-butylphenoxy ethanol, p-ter-amylphenoxy ethanol, lauryl phenoxy ethanol, o- or p-phenyl phenoxy ethanol, o- or p-benzyl phenoxy ethanol, o- or p-cyclohexyl phenoxy ethanol, and the hydroxyethyl ethers thereof can be converted into nuclear sulfonated aromatic ether or polyether alcohols useful as mercerizing assistants.

We claim:

1. In the process of mercerization, the improvement which comprises treating a fabric in an alkaline mercerizing liquor to which has been added a substance having the general formula R—O—X—OH wherein R is a sulfonated aromatic ring of the benzene and naphthalene series, and X is one of the group consisting of alkylene and polyalkylene ether radicals having at least two carbon atoms directly attached to each other in each alkylene group.

2. In the process of mercerization, the improvement which comprises treating a fabric in an alkaline mercerizing liquor to which has been added a substance having the formula

R—O—X—OH wherein R is an alkylated aromatic nucleus of the benzene and naphthalene series having at least one nuclear sulfonic acid group, and X is one of the group consisting of alkylene and polyalkylene ether radicals having at least two carbon atoms directly attached to each other in each alkylene group.

3. In the process of mercerization, the improvement which comprises treating a fabric in an alkaline mercerizing liquor to which has been added a substance having the general formula

R—O—C₂H₄OH wherein R is an alkyl phenyl group which is sulfonated in the phenyl ring.

4. In the process of mercerization, the improvement which comprises treating a fabric in an alkaline mercerizing liquor to which has been added a substance having the formula

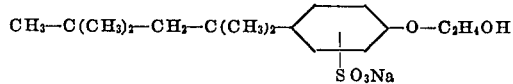

5. An alkaline mercerizing liquor to which has been added a compound having the general formula R—O—X—OH wherein R is a sulfonated aromatic ring of the benzene and naphthalene series, and X is one of the group consisting of alkylene and polyalkylene ether radicals having at least two carbon atoms directly attached to each other in each alkylene group.

6. An alkaline mercerizing liquor to which has been added a compound having the formula R—O—X—OH wherein R is an alkyl phenyl nucleus which is sulfonated in the aromatic ring and X is one of the group consisting of alkylene and polyalkylene ether radicals having at least two carbon atoms attached to each other in each alkylene group.

7. An alkaline mercerizing liquor to which has been added a compound having the formula R—O—C₂H₄OH wherein R is an alkyl phenyl group which is sulfonated in the phenyl ring.

HERMAN A. BRUSON.
CLINTON W. MacMULLEN.